(12) United States Patent
Kompotis et al.

(10) Patent No.: US 9,009,539 B1
(45) Date of Patent: Apr. 14, 2015

(54) IDENTIFYING AND GROUPING PROGRAM RUN TIME ERRORS

(71) Applicant: Splunk Inc., San Francisco, CA (US)

(72) Inventors: Alexandros Kompotis, San Francisco, CA (US); Panagiotis Papadopoulos, San Francisco, CA (US); Konstantinos Polychronis, San Francisco, CA (US)

(73) Assignee: Splunk Inc, San Francisco, CA (US)

( * ) Notice: Subject to any disclaimer, the term of this patent is extended or adjusted under 35 U.S.C. 154(b) by 0 days.

(21) Appl. No.: 14/218,906

(22) Filed: Mar. 18, 2014

(51) Int. Cl.
  *G06F 11/00* (2006.01)
  *G06F 11/36* (2006.01)
(52) U.S. Cl.
  CPC .................................. *G06F 11/3636* (2013.01)
(58) Field of Classification Search
  None
  See application file for complete search history.

(56) References Cited

U.S. PATENT DOCUMENTS

| | | | | |
|---|---|---|---|---|
| 2006/0253837 A1* | 11/2006 | Hudson et al. | | 717/124 |
| 2007/0038896 A1* | 2/2007 | Champlin et al. | | 714/38 |
| 2008/0010526 A1* | 1/2008 | Modani et al. | | 714/30 |
| 2008/0072102 A1* | 3/2008 | Elliott et al. | | 714/38 |
| 2009/0320045 A1* | 12/2009 | Griffith et al. | | 719/315 |

\* cited by examiner

*Primary Examiner* — Scott Baderman
*Assistant Examiner* — Jason Bryan
(74) *Attorney, Agent, or Firm* — Wong & Rees LLP; Kirk D. Wong

(57) ABSTRACT

A stack trace associated with an application program is received and at least one recognizable term is searched for in the stack trace. A digital signature is generated from at least a portion of the stack trace that includes the at least one recognizable term. If the digital signature matches a known digital signature among a plurality of known digital signatures, the stack trace is grouped with other stack traces associated with the known digital signature. Method call graphs in grouped stack traces may be analyzed to determine common pathways leading to an error.

18 Claims, 6 Drawing Sheets

201   200 java.lang.RuntimeException: exception requested-Connectivity Receiver@459b8868 bluead.app.subjectdispatcher.exceptions.RequestFailedException: [SD5293]

Wed Nov 09 18:55:29 GMT+08:00 2011 java.lang.RuntimeException: exception requested

```
java.lang.RuntimeException: exception requested-Connectivity Receiver@459b8868
at com.sfalma.trace.example.MainActivity$1.onClick(MainActivityThreaded.java:47)
at android.view.View.performClick(View.java:2408)
at android.view.View$PerformClick.run(View.java:8816)
at android.os.Handler.handleCallback(Handler.java:587)
at android.os.Handler.dispatchMessage(Handler.java:92)
at android.os.Looper.loop(Looper.java:123)
at android.app.ActivityThread.main(ActivityThread.java:4627)
at java.lang.reflect.Method.invokeNative(Native Method)
at java.lang.reflect.Method.invoke(Method.java:521)
at com.android.internal.os.ZygoteInit$MethodAndArgsCaller.run(ZygoteInit.java:868)
at com.android.internal.os.ZygoteInit.main(ZygoteInit.java:626)
at dalvik.system.NativeStart.main(Native Method)
```

303

302

```
java.lang.RuntimeException: exception requested-Connectivity Receiver@959b8877
at com.sfalma.trace.example.MainActivity$1.onClick(MainActivityThreaded.java:47)
at android.view.View.performClick(View.java:2408)
at android.view.View$PerformClick.run(View.java:8816)
at android.os.Handler.handleCallback(Handler.java:587)
at android.os.Handler.dispatchMessage(Handler.java:92)
at android.os.Looper.loop(Looper.java:123)
at android.app.ActivityThread.main(ActivityThread.java:4627)
at android.os.AsyncTask$2.call(AsyncTask.java:287)
at android.os.AsyncTask$SerialExecutor$1.run(AsyncTask.java:230)
at java.util.concurrent.ThreadPoolExecutor.runWorker(ThreadPoolExecutor.java:1076)
at java.util.concurrent.ThreadPoolExecutor$Worker.run(ThreadPoolExecutor.java:569)
at java.lang.reflect.Method.invokeNative(Native Method)
at java.lang.reflect.Method.invoke(Method.java:521)
at com.android.internal.os.ZygoteInit$MethodAndArgsCaller.run(ZygoteInit.java:868)
at com.android.internal.os.ZygoteInit.main(ZygoteInit.java:626)
at dalvik.system.NativeStart.main(Native Method)
```

0 Global 0x002e84fe 0xae000 + 2335998
 1 Global 0x002eb0b1 0xae000 + 2347185
 2 Global 0x002eb19d 0xae000 + 2347421
 3 Global 0x000d6785 0xae000 + 165765
 4 Global 0x000c61cb 0xae000 + 98763
 5 TCC 0x388b82d1 + 340
 6 TCC 0x388b956d + 28
 7 libxpc.dylib 0x3bfbaedf + 30
 8 libxpc.dylib 0x3bfbae8f + 26
 9 libdispatch.dylib 0x3be817d9 + 224
10 libdispatch.dylib 0x3be819c5 + 56
11 libsystem_pthread.dylib 0x3bfabdff _pthread_wqthread + 298
```

Fig. 4

IDENTIFYING AND GROUPING PROGRAM RUN TIME ERRORS

Application program providers typically create and distribute application programs that are ported to run on a variety of operating system and hardware platform combinations. The ability of an application program to consistently perform the tasks necessary to fulfill the purpose of the application program is key to the popularity of the application program among its users and, ultimately, the application program provider's success. An application program that abnormally terminates during normal operations in the field must be discovered as well as the reason why. The ability to detect the cause of an application program's abnormal termination is paramount to any application program provider's quality assurance program.

Having an application program that runs on many different operating system and hardware platform combinations spread across a large geographical area makes it difficult to discover the cause of abnormal terminations. Many operating systems attempt to report abnormal terminations of certain tightly bound application programs to the operating system provider. However, the cause of abnormal terminations of application programs that are not tightly bound to the operating system are left as a mystery to the application program provider because such terminations are not automatically reported by the operating system, but rather are inaccurately reported by users during customer support sessions.

BRIEF DESCRIPTION OF THE DRAWINGS

In the drawings:

FIG. 2 illustrates an example set of stack frames from an operating system containing arbitrary values, according to an embodiment of the invention;

FIG. 3 illustrates an example set of stack traces from an operating system, according to an embodiment of the invention;

FIG. 4 illustrates an example stack trace from an operating system, according to an embodiment of the invention;

DETAILED DESCRIPTION

Figure 1:
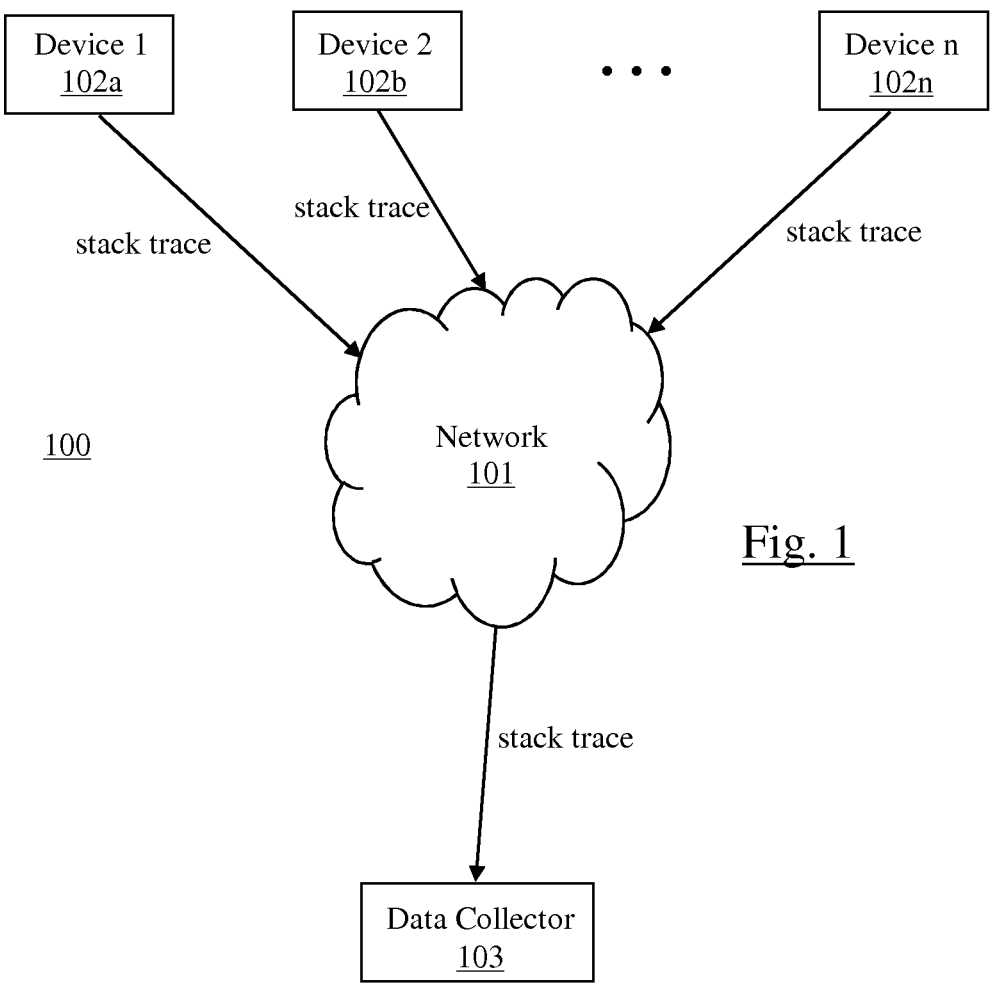
FIG. 1 illustrates an example network-based system of computing devices reporting stack traces to a data collector, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. General Overview
2.0. Operating Environment
3.0. Stack Trace Data Analysis
4.0. Example Process Flows
5.0. Implementation Mechanisms—Hardware Overview
6.0. Example Embodiments
7.0. Extensions and Alternatives

1.0. GENERAL OVERVIEW

This overview presents a basic description of some aspects of a possible embodiment of the present invention. It should be noted that this overview is not an extensive or exhaustive summary of aspects of the possible embodiment. Moreover, it should be noted that this overview is not intended to be understood as identifying any particularly significant aspects or elements of the possible embodiment, nor as delineating any scope of the possible embodiment in particular, nor the invention in general. This overview merely presents some concepts that relate to the example possible embodiment in a condensed and simplified format, and should be understood as merely a conceptual prelude to a more detailed description of example possible embodiments that follows below.

Application program developers/providers create and distribute application programs to end users. Each application program has been created to perform a desired function or set of functions, e.g., a browser, messaging program, email program, game, word processor, media viewer, utility program, etc. End users install application programs onto computing devices (e.g., cellular telephones, smart phones, mobile devices, tablet computers, laptop computers, personal computers, wearable devices, servers, set top boxes, gaming devices, etc.). As an application program runs on a computing device, the processor on the computing device executes the application program code to perform functionality associated with the application program. The application program code may make calls to operating system functions, utilities, hardware devices, etc., in order to complete tasks related to its functionality.

During the execution of the application program code, the application program code may encounter unknown or out of range values, stack overflows/underflows, unforeseen operator input, incompatible hardware or software, bugs in the system library functions, bugs in the code itself, etc., that will cause the application program to abnormally terminate (crash). In addition, the operating system may experience errors associated with its operation that may cause the application program code to crash. Discovering what caused the application program code to crash is difficult when the analysis is performed after the fact and remote from the computing device.

The underlying operating system typically tracks the method calls (and other information, depending on the operating system) that the application program makes during runtime—this is called the execution stack. When an application program crashes or throws an exception, the underlying operating system typically creates a trace of the nested method calls, which is called a stack trace. The stack trace normally tracks the sequence of nested methods called, up to the point where the stack trace was generated. This could mean up to the method where the crash occurred. However, this is not necessarily an indication of what caused the crash.

Programmers commonly use stack tracing during interactive and post-mortem debugging. A stack trace is comprised of multiple stack frames. Each stack frame can be a string of unstructured alphanumeric characters that indicate data relating to a method/function call. In some implementations of stack traces, method names and other data appear in the stack frames. The programmers manually walk through each stack frame in the stack trace to find an obvious error or where to perform further debugging.

In an embodiment, stack traces received from computing devices are gathered for specific application programs. In an embodiment, stack frames in a stack trace are stripped of arbitrary values. In an embodiment, each stack frame in a stack trace for a specific application program is analyzed to detect events that can indicate the type of error associated with the stack trace.

When a stack frame is found in the stack trace that fits a desired pattern, a signature is derived from the stack frame. The signature is compared to signatures of known errors. When the signature matches the signature of a known error, the stack trace is grouped together with stack traces that have been found to have a stack frame with the same signature. If the signature does not match any signature of known errors, the stack trace may be found to designate a new error and is added to the known signatures.

The stack traces in a group are analyzed to discover the core graph of nested calls that led to the crash of the application program. The patterns found in the core graph that are relevant to the application program indicate the cause of the crash.

Other embodiments include, without limitation, a non-transitory computer-readable medium that includes processor-executable instructions that enable a processing unit to implement one or more aspects of the disclosed methods as well as a system configured to implement one or more aspects of the disclosed methods.

2.0. OPERATING ENVIRONMENT

The data processing techniques described herein are suitable for use by systems deployed in a variety of operating environments. For example, FIG. 1 illustrates an example network-based system 100 of computing devices 102a-102n and data collector 103 in which the described techniques may be practiced, according to an embodiment.

Computing devices 102a-102n download and run application programs that are monitored by data collector 103. Computing devices 102a-102n may be general or special-purpose computers, e.g., cellular telephones, smart phones, mobile devices, tablet computers, laptop computers, personal computers, wearable devices, servers, set top boxes, gaming devices, etc. Computing devices 102a-102n may all be a same type of computing device or may be any combination of different types of computing devices. Generally, computing devices 102a-102n may comprise one or more processors and/or other suitable components configured to execute computer-readable instructions.

In an embodiment, computing devices 102a-102n may operate using operating systems that include, but are not limited to, any of: Android, iOS, Windows Phone, Windows, MacOS, Linux, etc. Computing devices 102a-102n may all be operating on a same type of operating system, or may be operating on any combination of different types of operating systems.

Data collector 103 is in communication with one or more storage devices that store collected stack traces. The one or more storage devices may comprise non-volatile computer-readable media that include, but are not limited to, any of: hard disk drives, flash/SSD drives, RAM, etc. Data collector 103 may comprise one or more general or special-purpose computers further comprising one or more processors and/or other suitable components configured to execute computer-readable instructions.

In an embodiment, a service may operate data collector 103 and may offer results from the analysis of stack trace information from data collector 103 to application program creators/providers/distributors, corporate IT departments, etc. In an embodiment, a service may operate data collector 103 and may offer results from the analysis of stack trace information from data collector 103 to application program creators/providers/distributors, corporate IT departments, etc., for a fee.

Data collector 103 communicates with computing devices 102a-102n via network 101. Network 101 may include, but is not limited to, any combination of: the Internet, intranet, local area network, wide area network, wired network link, wireless network link, cellular network link, etc.

System 100 is only one example of the many types of operating environments in which the techniques described herein may be practiced. Other suitable operating environments may include additional or fewer elements, in varying arrangements.

3.0. STACK TRACE DATA ANALYSIS

In an embodiment, computing devices 102a-102n may have downloaded and run a specific application program. The processor on the computing device executes the application program code to perform functionality associated with the application program.

During the execution of the application program code, the application program code may encounter unknown or out of range values, stack overflows/underflows, unforeseen operator input, incompatible hardware or software, bugs in the system library functions, bugs in the code itself, etc., that will cause the application program to abnormally terminate (crash). In addition, the operating system may experience errors associated with its operation that may cause the application program code to crash.

The underlying operating system typically tracks the method calls (and other information, depending on the operating system) that the application program makes during runtime—this is called the execution stack. When the application program code encounters an error and throws an exception, indicating a soft crash, the operating system creates a stack trace to indicate the application program code's method call stack before it threw the exception. In some cases, if the application program code encounters a hard, fatal crash, the stack trace may not reflect the entire method call stack. The stack trace normally tracks the sequence of nested methods called, up to the point where the stack trace was generated. This could mean up to the method where the crash occurred. However, this is not necessarily an indication of what caused the crash. Each line entry in the stack trace is called a stack frame.

The contents of a stack frame is not the same across different operating system platforms. Each operating system platform creates a stack frame with information that its developers believed would be helpful for debugging. Stack frames are, however, consistently unstructured alpha numeric text that needs to be parsed in order to discover the informational value of the stack frame.

In an embodiment, a reporting software module may be also installed on a computing device. The reporting software module may run as a background process, may be part of an SDK running in the background, may be part of the operating system, etc. In an embodiment, when an exception is thrown, the reporting software module may be notified that a stack trace has been assembled by the operating system. The reporting software module may gather the data from the stack trace and send the stack trace to the data collector 103 over network 101. The reporting software module may include other information with the stack trace data, e.g., operating system, hardware platform data, etc.

Data collector 103 receives stack traces from computing devices 102a-102n. In some embodiments, the computing devices may be cellular devices that can include any combination of: cellular phones, smartphones, tablets, etc. In such cases, network 101 may include at least a cellular network. In some embodiments, computing devices may include any combination of: desktop computers, laptop computers, servers, etc. In such cases, network 101 may include any combination of: the Internet, intranet, local area network, wide area network, wired network link, wireless network link, etc.

Referring to FIG. 2, a stack frame 201 in a stack trace 200 consists of a string of characters—this can also be described as an unstructured string of characters. As mentioned above, the amount of information in a stack frame can vary between operating systems and sometimes between versions of operating systems. The operating system may place arbitrary values in the stack frames within the stack trace 200, e.g., thread numbers, dates, times, memory size, exception names, etc. The data collector 103 processes the stack trace by first removing the arbitrary values. The random placement of these values in the stack frames can introduce noise that affects the digital signature generation described below.

Once the data collector 103 cleans the stack trace data by removing the arbitrary values, it then parses the stack trace data in order to find the key method call or calls where the error occurred. Many times the same errors may generate slightly different stack traces. This may happen when the application program code takes a different route in the code flow, but ends up calling the same method or executes the same code that causes the error. The data collector 103 applies different heuristic functions on the stack trace data in order to create a unique signature for the stack trace that allows the data collector 103 to categorize similar stack traces as part of the same error group or as a totally new and unique error.

In an embodiment, the data collector 103, parses the stack trace data to distinguish the method calls to Application Calls or API Calls (e.g., Operating System, App Frameworks, Libraries, $3^{rd}$ party SDKs, etc.). In an embodiment, the data collector 103 can distinguish between stack traces received from computing devices 102a-102n running on different operating systems (e.g., Android, iOS, Windows Phone, Windows, MacOS, Linux, etc.).

In an embodiment, the data collector 103 parses the data in the stack trace using regular expressions. A regular expression (abbreviated regex or regexp) is a sequence of characters that forms a search pattern for use in pattern matching with strings. Regular expressions can be used to identify textual material of a given pattern.

For example, a stack trace of method calls from the Android framework F leading to an exception E, possibly through an application A and an API I, can be described through the following regular expression:

$(F+(A+I^*)^*)|(F^*(A+I^*)+)E$

This expresses various scenarios in which an exception can occur:

Within the Android framework: F+E
Within the application: F*A+E
When the application calls an API: F*A+I+E
Within an API-registered application callback: F*(A+I+A+)+E
When an API-registered application callback calls an API: F*(A+I+)+E To locate API calls that lead to application crashes, the goal is to locate the last instance of an AI pair. In an embodiment, as the data collector 103 has no a priori knowledge of the methods that belong to the sets F, A, and I, it may use following process and heuristics to determine the methods.

The priorities for creating signatures are:

If the exception is caused by application methods A, then disregard all other method calls I, F.
If the exception is caused by a $3^{rd}$ party library or API call I, then disregard all framework calls F.
If the exception is caused by the OS/Framework then only examine its methods F.

In an embodiment, the data collector 103 parses the unstructured data in the stack trace using a search schema. In an embodiment, the data collector 103 parses the data containing method names and other data in the stack trace using a search schema.

Once the data collector 103 has filtered through the stack trace data and found the subset of functions that it needs (e.g., one or more stack frames containing the function calls), it can then apply a digital signature function (e.g., MD5, SHA, or other hash or digital signature algorithms) on the stack trace data subset(s) needed to identify the error. The result is the error hash signature that the data collector 103 uses to identify whether an error has been seen before in the system or whether it is a first seen error. In an embodiment, the data collector 103 finds the last (closest to the occurrence of the error exception) stack frame instance of an AI pair in the stack trace and generates a digital signature of the stack frame.

Referring to FIG. 3, in the case of an Android operating system, the data collector 103 can identify the stack traces 301 and 302 as the same error even though the call graph is the different. After cleaning up the stack traces by removing the arbitrary values from the stack traces, data collector 103 processes the stack trace data to identify the stack frame to generate a digital signature on. Here, stack frame 303 has been identified as the last instance of the application's package name ("com.sfalma.trace.example" with a method name of "onClick") and of an AI pair (MainActivityThreaded.java:47) of stack trace 301. In stack trace 302, stack frame 304 has been identified as the last instance of an AI pair (MainActivityThreaded.java:47). In an embodiment, stack frame 303 may be identified by finding the last instance of the application's package name.

Data collector 103 generates a digital signature for stack frame 303 and a digital signature for stack frame 304. The two digital signatures are identified as equal and the stack traces 301 and 302 are found to be representing the same error. Note that the call graph for stack trace 301 is different than the call graph of stack trace 302.

Referring to FIG. 4, in the case of the iOS operating system, the data collector 103 groups errors in a similar manner, but it does not take the whole stack frame into consideration. Most iOS applications are released with stripped symbols. This means that the unstructured data in the stack frame 401 that the data collector 103 receives from an iOS computing device is in hex code.

Stack frame 402 is decoded as:
0 is the frame number
Global is the binary image name
0x002e84fe is the runtime address
0xae000 is the load address
2335998 is the offset As with the Android operating system, data collector 103 processes the stack trace looking for methods that belong to an application. In this example all applications that contain the string Global. Data collector 103 processes the stack trace, but instead of taking into consideration the whole line of a stack frame in the stack trace, all that is needed are the load address and the offset. Data collector 103 generates a digital signature of the load address and the offset for comparison to other digital signatures gathered by data collector 103.

In an embodiment, data collector 103 groups stack traces together based on generated digital signatures. In an embodiment, data collector 103 groups received stack traces together as reported by a specific operating system. The grouped stack traces represent a common error and can be further analyzed for method call graphs. Further, the grouped stack traces can be used to generate statistical reports on, e.g., number of errors for a specific application program on a specific hardware platform, number of errors for a specific application program on a specific operating system, number of errors for a specific application program across all platforms, etc.

In an embodiment, more than one data collector may exist in the system. Data collectors may be designated as receiving points, e.g., for specific cellular networks, for specific application program developers/providers, etc. Computing devices 102a-102n may deliver stack traces to their assigned data collectors.

4.0 EXAMPLE PROCESS FLOWS

Figure 5:
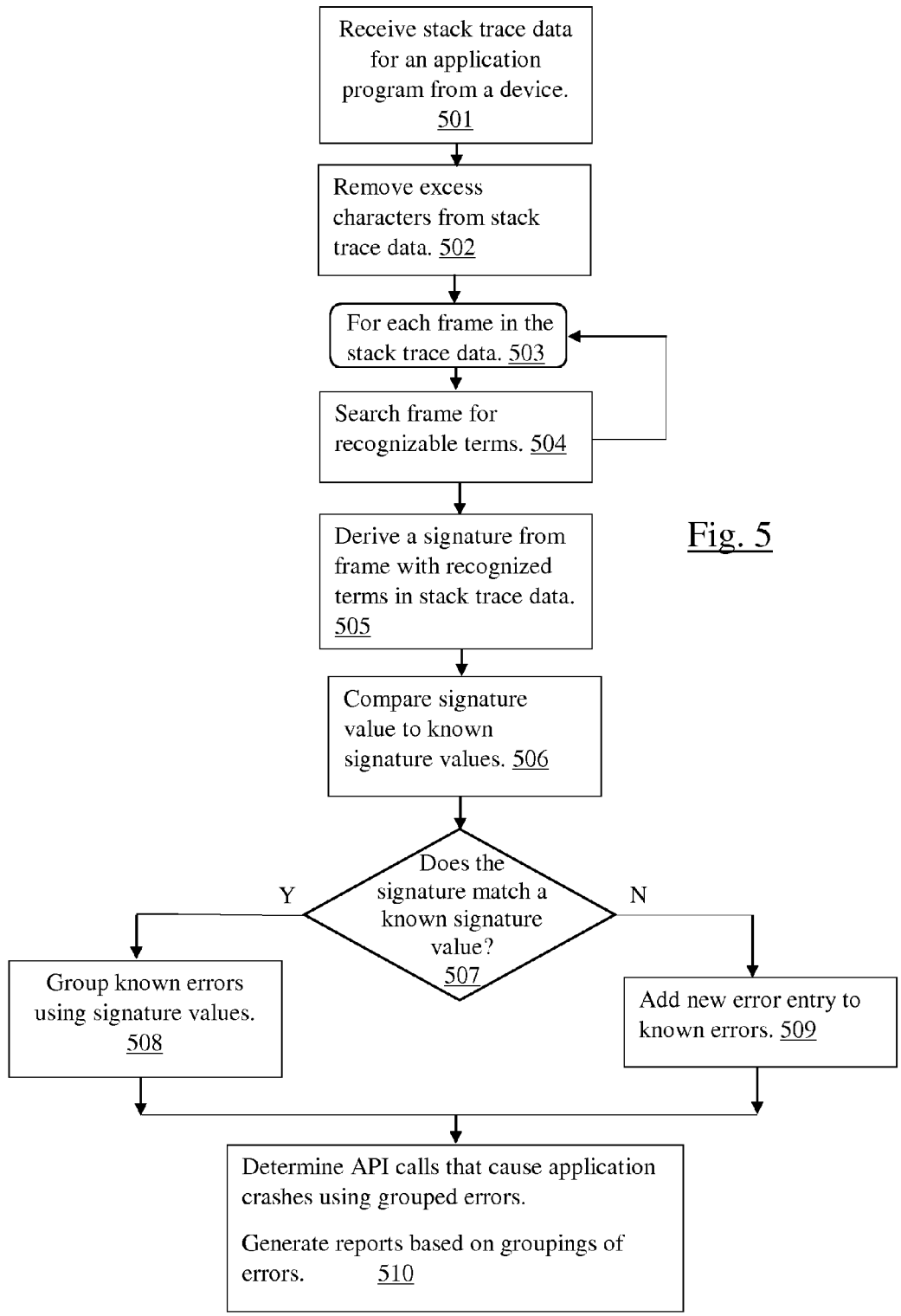
FIG. 5 illustrates an example process flow, according to an embodiment of the invention.

FIG. 5 illustrates an example process flow. In some embodiments, this process flow is performed through one or more computing devices or units. In block 501, a data collector 103 receives a stack trace from a computing device 102a-102n. In an embodiment, in block 502, data collector 103 cleans up the stack trace data to remove any arbitrary values from the unstructured stack trace data. In an embodiment, in block 502, data collector 103 cleans up the stack trace data to remove any arbitrary values from the stack trace data that contains method names as well as other data. In an embodiment, the data collector 103 determines the origination operating system of the stack trace in order to process the stack trace.

In an embodiment, in block 503 and 504, data collector 103 parses each stack frame in the cleaned up stack trace a searches for recognizable terms in the unstructured data. In an embodiment, in block 503 and 504, data collector 103 parses each stack frame in the cleaned up stack trace a searches for recognizable terms in the data containing method names and other data. In an embodiment, data collector 103 uses regular expressions to find recognizable terms in the stack trace data. In an embodiment, data collector 103 uses a search schema to find recognizable terms in the stack trace data. Data collector 103 selects the last of the stack frames, prior to the error, containing pertinent method call(s) that were recognized through the parsing.

In block 505, data collector 103 generates a digital signature from the selected stack frame. In an embodiment, data collector 103 generates a digital signature from a portion of the selected stack frame.

In block 506, data collector 103 compares the digital signature with digital signatures that are associated with known errors. In an embodiment, the digital signatures that are associated with known errors are stored in a storage device in communication with data collector 103. In an embodiment, the digital signatures that are associated with known errors are stored at a database server in communication with data collector 103.

In block 507, if the digital signature matches a digital signature that is associated with a known error, then execution flow is directed to block 508. In block 508, the stack trace is grouped together with the stack traces that are associated with the known error. In an embodiment, the stack trace is stored in at least one storage device in communication with data collector 103 along with the stack traces that are associated with the known error. In an embodiment, the stack trace is stored at a database server in communication with data collector 103 along with the stack traces that are associated with the known error. Execution flow is then directed to block 510.

In block 507, if the digital signature does not match any digital signature that is associated with a known error, then execution flow is directed to block 509. In block 509, the digital signature is designated as a new error and the digital signature is added to the digital signatures of the known errors. In an embodiment, the digital signature is stored in at least one storage device in communication with data collector 103 along with other digital signatures that are associated with known errors. In an embodiment, the digital signature is stored at a database server in communication with data collector 103 along with other digital signatures that are associated with known errors. In an embodiment, the stack trace is associated with the digital signature and stored in at least one storage device in communication with data collector 103 along with stack traces that are associated with the other known errors. In an embodiment, the stack trace is associated with the digital signature and stored at a database server in communication with data collector 103 along with stack traces that are associated with the other known errors. Execution flow is then directed to block 510.

In block 510, in an embodiment, the grouped stack traces may be used to create method call graphs using the nested method calls in the stack traces. The method call graphs for each stack trace may be analyzed as a group, possibly by the data collector 103, by looking at pathways in the method call graphs leading to the error. The cause of the error may be found by finding a common pattern among the pathways. In an embodiment, reports may be generated using statistics drawn from the members of the grouped stack traces. For example, reports may be generated including, but not limited to, any of: number of errors for a specific application program on a specific hardware platform, number of errors for a specific application program on a specific operating system, number of errors for a specific application program across all platforms, number of errors for a specific application for a specific cellular carrier, comparison of number of errors for a specific application across different operating systems, comparison of number of errors for a specific application across different hardware platforms, comparison of number of errors for a specific application across different cellular carriers, etc.

In an embodiment, a reporting module may generate the reports and may be part of data collector 103. In an embodiment, a reporting module may generate the reports and may be external to and in communication with data collector 103. In an embodiment, the reporting module may have access to at least one storage device in communication with data collector 103. In an embodiment, the reporting module may have access to a database server in communication with data collector 103.

Note that any of the functionality described above may be localized or distributed in any combination across one or more data collectors, one or more computing devices, one or more servers, etc.

In an embodiment, an apparatus comprises a processor and is configured to perform any of the foregoing methods.

In an embodiment, a non-transitory computer readable storage medium, storing software instructions, which when executed by one or more processors cause performance of any of the foregoing methods.

Note that, although separate embodiments are discussed herein, any combination of embodiments and/or partial embodiments discussed herein may be combined to form further embodiments.

5.0 IMPLEMENTATION MECHANISMS—HARDWARE OVERVIEW

According to an embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
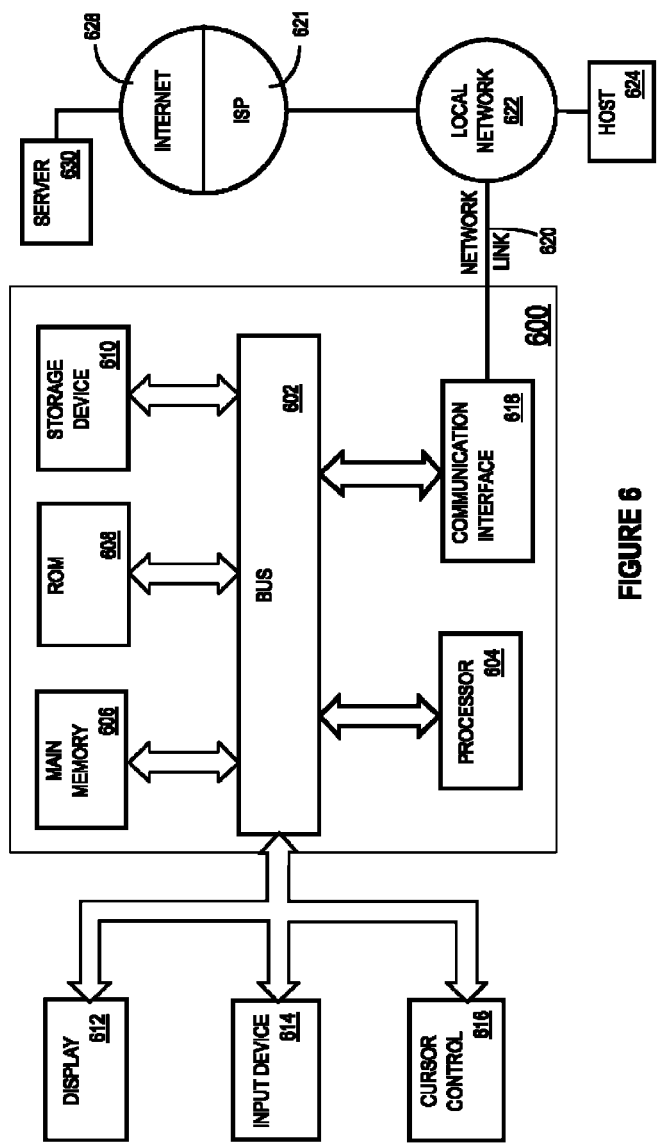
FIG. 6 illustrates a computer system upon which an embodiment may be implemented.

For example, FIG. 6 is a block diagram that illustrates a computer system 600 upon which an embodiment may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

6.0 EXAMPLE EMBODIMENTS

In an embodiment, a method or non-transitory computer readable medium comprises: receiving a stack trace associated with an application program; searching for at least one recognizable term in the stack trace; generating a digital signature from at least a portion of the stack trace that includes the at least one recognizable term; determining whether the digital signature matches a known digital signature of a plurality of known digital signatures; in response to determining that the digital signature matches a known digital signature among the plurality of known digital signatures, grouping the stack trace with other stack traces associated with the known digital signature.

In an embodiment, the method or computer readable medium further comprises: wherein the stack trace is received from a remote computing device.

In an embodiment, the method or non-transitory computer readable medium further comprises: wherein the searching step parses the stack trace using at least one regular expression to find the at least one recognizable term.

In an embodiment, the method or non-transitory computer readable medium further comprises: wherein the grouping step stores the stack trace along with the other stack traces associated with the known digital signature.

In an embodiment, the method or non-transitory computer readable medium further comprises: in response to determining that the digital signature does not match a known digital signature among the plurality of known digital signatures: adding the digital signature to the plurality of known digital signatures; storing the stack trace; and associating the stored stack trace with the digital signature.

In an embodiment, the method or non-transitory computer readable medium further comprises: analyzing a group of stack traces associated with a known digital signature; generating a report based on at least a count of stack traces in the group of stack traces associated with the known digital signature.

In an embodiment, the method or non-transitory computer readable medium further comprises: analyzing method call graphs of a group of stack traces associated with a known digital signature; determining a common pattern among pathways leading to an error in the method call graphs of the group of stack traces associated with the known digital signature.

In an embodiment, an apparatus comprises: a stack trace receiving subsystem, implemented at least partially in hardware, that receives a stack trace associated with an application program; a search subsystem, implemented at least partially in hardware, that searches for at least one recognizable term in the stack trace; a digital signature subsystem, implemented at least partially in hardware, that generates a digital signature from at least a portion of the stack trace that includes the at least one recognizable term; a matching subsystem, implemented at least partially in hardware, that determines whether the digital signature matches a known digital signature of a plurality of known digital signatures; a grouping subsystem, implemented at least partially in hardware, that, in response to determining that the digital signature matches a known digital signature among the plurality of known digital signatures, groups the stack trace with other stack traces associated with the known digital signature.

In an embodiment, the apparatus further comprises: wherein the stack trace is received from a remote computing device.

In an embodiment, the apparatus further comprises: wherein the search subsystem parses the stack trace using at least one regular expression to find the at least one recognizable term.

In an embodiment, the apparatus further comprises: wherein the grouping subsystem stores the stack trace along with the other stack traces associated with the known digital signature.

In an embodiment, the apparatus further comprises: a subsystem, implemented at least partially in hardware, that, in response to determining that the digital signature does not match a known digital signature among the plurality of known digital signatures: a subsystem, implemented at least partially in hardware, that adds the digital signature to the plurality of known digital signatures; a subsystem, implemented at least partially in hardware, that stores the stack trace; and a subsystem, implemented at least partially in hardware, that associates the stored stack trace with the digital signature.

In an embodiment, the apparatus further comprises: a subsystem, implemented at least partially in hardware, that analyzes a group of stack traces associated with a known digital signature; a subsystem, implemented at least partially in hardware, that generates a report based on at least a count of stack traces in the group of stack traces associated with the known digital signature.

In an embodiment, the apparatus further comprises: a subsystem, implemented at least partially in hardware, that analyzes method call graphs of a group of stack traces associated with a known digital signature; a subsystem, implemented at least partially in hardware, that determines a common pattern among pathways leading to an error in the method call graphs of the group of stack traces associated with the known digital signature.

7.0 EXTENSIONS AND ALTERNATIVES

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the embodiments, and what is intended by the applicants to be the scope of the embodiments, is the literal and equivalent scope of the set of claims that issue from this application, in the specific form in which such claims issue, including any subsequent correction.

In drawings, various system components are depicted as being communicatively coupled to various other components by arrows. These arrows illustrate only certain examples of information flows between the components of the depicted systems. Neither the direction of the arrows nor the lack of arrow lines between certain components should be interpreted as indicating the absence of communication between the certain components. Indeed, each component of the

What is claimed is:

1. A method comprising:
   receiving a stack trace associated with an application program;
   searching for at least one recognizable term in the stack trace;
   generating a digital signature from at least a portion of the stack trace that includes the at least one recognizable term;
   determining whether the digital signature matches a known digital signature of a plurality of known digital signatures;
   in response to determining that the digital signature matches a known digital signature among the plurality of known digital signatures, grouping the stack trace with other stack traces associated with the known digital signature;
   analyzing method call graphs of a group of stack traces associated with a known digital signature;
   determining a common pattern among pathways leading to an error in the method call graphs of the group of stack traces associated with the known digital signature.

2. The method of claim 1, wherein the stack trace is received from a remote computing device.

3. The method of claim 1, wherein the searching step parses the stack trace using at least one regular expression to find the at least one recognizable term.

4. The method of claim 1, wherein the grouping step stores the stack trace along with the other stack traces associated with the known digital signature.

5. The method of claim 1, further comprising:
   in response to determining that the digital signature does not match a known digital signature among the plurality of known digital signatures:
      adding the digital signature to the plurality of known digital signatures;
      storing the stack trace; and
      associating the stored stack trace with the digital signature.

6. The method of claim 1, further comprising:
   analyzing a group of stack traces associated with a known digital signature;
   generating a report based on at least a count of stack traces in the group of stack traces associated with the known digital signature.

7. An apparatus comprising:
   a stack trace receiving subsystem, implemented at least partially in hardware, that receives a stack trace associated with an application program;
   a search subsystem, implemented at least partially in hardware, that searches for at least one recognizable term in the stack trace;
   a digital signature subsystem, implemented at least partially in hardware, that generates a digital signature from at least a portion of the stack trace that includes the at least one recognizable term;
   a matching subsystem, implemented at least partially in hardware, that determines whether the digital signature matches a known digital signature of a plurality of known digital signatures;
   a grouping subsystem, implemented at least partially in hardware, that, in response to determining that the digital signature matches a known digital signature among the plurality of known digital signatures, groups the stack trace with other stack traces associated with the known digital signature;
   a subsystem, implemented at least partially in hardware, that analyzes method call graphs of a group of stack traces associated with a known digital signature;
   a subsystem, implemented at least partially in hardware, that determines a common pattern among pathways leading to an error in the method call graphs of the group of stack traces associated with the known digital signature.

8. The apparatus of claim 7, wherein the stack trace is received from a remote computing device.

9. The apparatus of claim 7, wherein the search subsystem parses the stack trace using at least one regular expression to find the at least one recognizable term.

10. The apparatus of claim 7, wherein the grouping subsystem stores the stack trace along with the other stack traces associated with the known digital signature.

11. The apparatus of claim 7, further comprising:
    a subsystem, implemented at least partially in hardware, that, in response to determining that the digital signature does not match a known digital signature among the plurality of known digital signatures:
       a subsystem, implemented at least partially in hardware, that adds the digital signature to the plurality of known digital signatures;
       a subsystem, implemented at least partially in hardware, that stores the stack trace; and
       a subsystem, implemented at least partially in hardware, that associates the stored stack trace with the digital signature.

12. The apparatus of claim 7, further comprising:
    a subsystem, implemented at least partially in hardware, that analyzes a group of stack traces associated with a known digital signature;
    a subsystem, implemented at least partially in hardware, that generates a report based on at least a count of stack traces in the group of stack traces associated with the known digital signature.

13. A non-transitory computer readable storage medium, storing software instructions, which when executed by one or more processors cause performance of steps of:
    receiving a stack trace associated with an application program;
    searching for at least one recognizable term in the stack trace;
    generating a digital signature from at least a portion of the stack trace that includes the at least one recognizable term;
    determining whether the digital signature matches a known digital signature of a plurality of known digital signatures;
    in response to determining that the digital signature matches a known digital signature among the plurality of known digital signatures, grouping the stack trace with other stack traces associated with the known digital signature;
    analyzing method call graphs of a group of stack traces associated with a known digital signature;
    determining a common pattern among pathways leading to an error in the method call graphs of the group of stack traces associated with the known digital signature.

14. The non-transitory computer readable storage medium of claim 13, wherein the stack trace is received from a remote computing device.

15. The non-transitory computer readable storage medium of claim 13, wherein the searching step parses the stack trace using at least one regular expression to find the at least one recognizable term.

16. The non-transitory computer readable storage medium of claim 13, wherein the grouping step stores the stack trace along with the other stack traces associated with the known digital signature.

17. The non-transitory computer readable storage medium of claim 13, further comprising:
   in response to determining that the digital signature does not match a known digital signature among the plurality of known digital signatures:
      adding the digital signature to the plurality of known digital signatures;
      storing the stack trace; and
      associating the stored stack trace with the digital signature.

18. The non-transitory computer readable storage medium of claim 13, further comprising:
   analyzing a group of stack traces associated with a known digital signature;
   generating a report based on at least a count of stack traces in the group of stack traces associated with the known digital signature.

* * * * *